United States Patent
Yang et al.

(10) Patent No.: US 12,228,280 B2
(45) Date of Patent: Feb. 18, 2025

(54) VAPOR SOURCE SYSTEM BASED ON VAPOR-LIQUID EJECTOR SUPERCHARGING COMBINED WITH FLASH VAPORIZATION TECHNOLOGY

(71) Applicants: DALIAN UNIVERSITY OF TECHNOLOGY, Dalian (CN); Dalian Ocean University, Dalian (CN)

(72) Inventors: Yong Yang, Dalian (CN); Xingyao Zhang, Dalian (CN); Zelong Xie, Dalian (CN); Yuzhe Zhang, Dalian (CN); Kun Zhang, Dalian (CN); Shengqiang Shen, Dalian (CN)

(73) Assignees: DALIAN UNIVERSITY OF TECHNOLOGY, Dalian (CN); Dalian Ocean University, Dalian (CN)

( * ) Notice: Subject to any disclaimer, the term of this patent is extended or adjusted under 35 U.S.C. 154(b) by 356 days.

(21) Appl. No.: 17/946,131

(22) Filed: Sep. 16, 2022

(65) Prior Publication Data
US 2023/0018348 A1   Jan. 19, 2023

Related U.S. Application Data

(63) Continuation of application No. PCT/CN2021/113134, filed on Aug. 18, 2021.

(30) Foreign Application Priority Data

Jul. 12, 2021   (CN) .................... 202110785694.4

(51) Int. Cl.
F22B 37/72   (2006.01)
F22B 3/04    (2006.01)
(Continued)

(52) U.S. Cl.
CPC .............. *F22B 37/60* (2013.01); *F22B 3/045* (2013.01); *F28D 21/001* (2013.01); *F28D 15/0266* (2013.01)

(58) Field of Classification Search
CPC .... F28D 21/001; F28D 15/0266; F22B 3/045; F22B 37/60; F22B 27/14; F22B 37/26;
(Continued)

(56) References Cited

U.S. PATENT DOCUMENTS

| | | | |
|---|---|---|---|
| 3,796,640 A * | 3/1974 | Boomer | B01D 1/2803 202/205 |
| 2001/0020649 A1 | 9/2001 | Miquel et al. | |
| 2010/0251976 A1* | 10/2010 | Ravulaparthy | F22B 29/12 122/406.5 |

FOREIGN PATENT DOCUMENTS

| | | |
|---|---|---|
| CA | 2665751 A1 | 11/2009 |
| CN | 105864743 A * | 8/2016 |

(Continued)

*Primary Examiner* — Gregory A Wilson
(74) *Attorney, Agent, or Firm* — Nitin Kaushik

(57) ABSTRACT

A vapor source system based on vapor-liquid ejector supercharging combined with flash vaporization technology belongs to the technical fields of waste heat utilization and steam generation. The system comprises a vapor-liquid ejector, a flash vaporization tank and a intermediate heat exchanger, wherein the vapor-liquid ejector uses high-pressure steam to raise temperature and pressure of low-pressure water absorbed from the flash vaporization tank; the pressure-increased water is flashed into low-pressure saturated steam after entering the flash vaporization tank; the saturated water which is not flashed is collected at the bottom of the flash vaporization tank. The system generates multiple low-pressure flash vaporization saturated steam with a small portion of high-pressure steam, and realizes the recovery and utilization of waste heat such as flue gas of boiler, improves the economy of thermal process, and provides a flexible and (Continued)

adjustable vapor source for heavy oil thermal recovery, seawater desalination or sewage treatment equipment.

5 Claims, 4 Drawing Sheets

(51) Int. Cl.
*F22B 37/60* (2006.01)
*F28D 21/00* (2006.01)
*F28D 15/02* (2006.01)

(58) Field of Classification Search
CPC .... F22B 3/04; F22B 37/72; F22D 1/00; F22D 7/04
See application file for complete search history.

(56) References Cited

FOREIGN PATENT DOCUMENTS

| | | | |
|---|---|---|---|
| CN | 106194298 | A | 12/2016 |
| CN | 206146160 | U | 5/2017 |
| CN | 206387141 | U | 8/2017 |
| CN | 109083705 | A | 12/2018 |
| CN | 211316632 | U * | 8/2020 |

* cited by examiner

_US 12,228,280 B2_

VAPOR SOURCE SYSTEM BASED ON VAPOR-LIQUID EJECTOR SUPERCHARGING COMBINED WITH FLASH VAPORIZATION TECHNOLOGY

CROSS-REFERENCE TO RELATED APPLICATIONS

The application claims priority to Chinese patent application No. 202110785694.4, filed on Jul. 12, 2021, the entire contents of which are incorporated herein by reference.

TECHNICAL FIELD

The present disclosure relates to a vapor source system based on vapor-liquid ejector supercharging combined with flash vaporization technology, which belongs to the technical fields of heavy oil thermal recovery, seawater desalination and sewage treatment.

BACKGROUND

The oil exploration has entered the stage of heavy oil thermal recovery in China, and heavy oil thermal recovery needs to consume a large amount of steam and fresh water. A vapor source system capable of supplying medium-low pressure steam to large and medium-sized multi-effect evaporation or multi-stage flash evaporation or other thermal seawater desalination or sewage treatment devices is important auxiliary equipment for heavy oil thermal recovery.

The steam injection boiler for heavy oil thermal recovery generally uses crude oil, diesel oil and natural gas as fuels, generating 10-21 MPa saturated or superheated steam to inject into oil wells, heating the crude oil in the oil layer to reduce the viscosity of heavy oil to improve the recovery ratio of heavy oil. Generally, the evaporation capacity of boiler reaches 18t/h and above. If the high-pressure steam generated by the steam injection boiler is used directly or with decompressor for the seawater desalination or sewage treatment device, it will cause significant energy waste and reduce water production economy.

In addition, the exhaust gas temperature of small-sized steam boilers is relatively high, generally between 140° C. and 270° C., owing high recovery value, however, due to scattered distribution of the flue gas, there is no universal technology with high thermal economy. If the waste heat from the flue gas of small-sized steam boiler is used for thermal seawater desalination or sewage treatment device to produce high-quality feed water of the boiler, the feed water quality of boiler can be greatly improved, the risk of boiler scaling and clogging can be reduced, the thermal efficiency and service life of the boiler can be significantly elevated, the energy utilization efficiency of fossil fuels can be promoted, and the water production cost of thermal seawater desalination or sewage treatment can be greatly reduced, which will bring obvious economic and environmental benefits, and help to realize the energy development strategy of "Carbon Peak, Carbon Neutrality" in China as soon as possible.

To this end, this patent proposes a vapor source system based on vapor-liquid ejector supercharging combined with flash vaporization technology.

SUMMARY

The present disclosure is directed to a vapor source system based on vapor-liquid ejector supercharging combined with flash vaporization technology. In view of the above problems, when high pressure steam generated by the steam injection boiler for heavy oil thermal recovery is used directly or with decompressor for multi-effect evaporation or multi-stage flash evaporation or other thermal seawater desalination or sewage treatment processes, the energy loss is relatively dominant and the water production economy reduces obviously. To solve this problem, the high-pressure steam is used to drive the vapor-liquid ejector, while the low-pressure water in the flash vaporization tank is sucked to increase pressure and temperature and then sent to the intermediate heat exchanger for further increasing temperature to saturated or nearly saturated state, and multiple low-pressure steam is flashed in the flash vaporization tank to improve the thermal economy of low-pressure steam process. The intermediate heat exchanger of the vapor source system may use the flue gas of the boiler as a heat source, and realize the waste heat utilization of the boiler flue gas in the form of a split-type heat pipe heat exchanger, a heat-conducting oil heat exchanger or a flue gas heat exchanger, etc., so as to improve the energy utilization efficiency of the boiler. When the low-pressure steam process is multi-effect evaporation or multi-stage flash evaporation or other thermal seawater desalination or sewage treatment, the feed water in the flash vaporization tank may come from the fresh water produced in the thermal water treatment device or other devices.

The technical solution adopted by the present disclosure is: a vapor source system based on vapor-liquid ejector supercharging combined with flash vaporization technology, the vapor source system comprising a vapor-liquid ejector, a intermediate heat exchanger, a flash vaporization tank and a feedwater pump, wherein each device is connected by pipeline; the vapor-liquid ejector is successively connected by a convergent-divergent primary nozzle, a suction chamber, a mixing chamber and a diffusion chamber, and a high-pressure steam inlet is connected to the inlet of the primary nozzle, meanwhile an injection fluid inlet of the suction chamber is connected to a bottom of the flash vaporization tank, and an outlet of the diffusion chamber is connected to the cold fluid inlet of the intermediate heat exchanger; wherein, the vapor source system is driven by high-pressure motive steam, and a supersonic jet is generated at the outlet of the primary nozzle, then vacuum is formed in the suction chamber, so low-pressure water of the flash vaporization tank is sucked into the vapor-liquid ejector, then the vapor-liquid mixing and condensation pressure increasing are completed in the mixing chamber, after that the pressure of the mixed fluid is continued to increase in the diffusion chamber, and the mixed fluid is sent into the intermediate heat exchanger to increase temperature to saturated or nearly saturated fluid, then sent into the flash vaporization tank to flash, and low-pressure saturated steam is generated; the low-pressure saturated water which is not flashed is collected at the bottom of the flash vaporization tank, and is connected with the injection inlet of the suction chamber via the extraction pipe at the bottom of the flash vaporization tank, so as to realize a circulating supercharging flash vaporization; the feed water pump sends the low-pressure water to the bottom of the flash vaporization tank to ensure the continuous and stable operation of the vapor source system.

The intermediate heat exchanger of the vapor source system may use the waste heat of the flue gas of the steam boiler as heating heat source, and the specific form thereof may be a split-type heat pipe heat exchanger, a heat-conducting oil heat exchanger or a flue gas heat exchanger, and the technical solutions used are: When the waste heat exchanger is a split-type heat pipe heat exchanger, the intermediate heat exchanger and the split-type heat pipe evaporator form a closed loop; the split-type heat pipe evaporator is arranged in the rear flue of the steam boiler to utilize the waste heat of the flue gas; after being evaporated, the heat pipe working medium enters the intermediate heat exchanger to release condensation latent heat, heating the pressure-increased water at the outlet of the vapor-liquid ejector; after being condensed into liquid state, the heat pipe working medium returns to the split-type heat pipe evaporator to cyclically utilize the waste heat of the flue gas; When the waste heat exchanger is a heat-conducting oil heat exchanger, the intermediate heat exchanger and the heat-conducting oil heat collector form a closed loop; the heat-conducting oil heat collector is arranged in the rear flue of the steam boiler to utilize the waste heat of the flue gas; the heat-conducting oil enters the intermediate heat exchanger after increasing temperature; the pressure-increased water at the outlet of the vapor-liquid ejector is heated; the heat-conducting oil returns to the heat-conducting oil heat collector after decreasing temperature; and the waste heat of the flue gas is circularly utilized; When the waste heat exchanger is a flue gas heat exchanger, the intermediate heat exchanger is arranged in the rear flue of the steam boiler to directly utilizer the waste heat of the flue gas, and the pressure-increased water at the outlet of the vapor-liquid ejector is sent to the intermediate heat exchanger via connecting pipeline to utilize the waste heat of the flue gas, and then sent to the flash vaporization tank via the connecting pipeline to flash.

The vapor source system may supply steam to multi-effect evaporation or multi-stage flash evaporation or other thermal seawater desalination or sewage treatment devices, and then the feed water of the vapor source system may be the product water of the thermal water treatment device, and is pumped to the bottom of the flash vaporization tank after being pressurized by a water pump, so as to ensure the continuous and stable operation of the vapor source system.

Advantageous effects of the present disclosure are: using a vapor-liquid ejector, a small portion of high-pressure steam is used to suck low-pressure water in the flash vaporization tank, and the water is heated up and increased in pressure and then sent to the flash vaporization tank to flash multiple low-pressure saturated steam, so as to improve the thermal economy of the low-pressure steam process; at the same time, the intermediate heat exchanger of the vapor source system may use the waste heat of the flue gas of the rear flue of the steam boiler in various ways to improve the energy utilization efficiency of the boiler and realize energy conserving and emission reduction; When the vapor source system is used in multi-effect evaporation or multi-stage flash evaporation or other thermal seawater desalination or sewage treatment devices, the product water quality of the thermal water treatment device can be improved, the feed water quality of the steam boiler can be promoted, the risk of boiler scaling and clogging will reduce, and the thermal efficiency and service life of the boiler can be significantly elevated.

DETAILED DESCRIPTION OF THE EMBODIMENTS

The technical solutions in the implementation of the present disclosure will be clearly and completely described below with reference to the accompanying drawings of the present disclosure.

Figure 1:
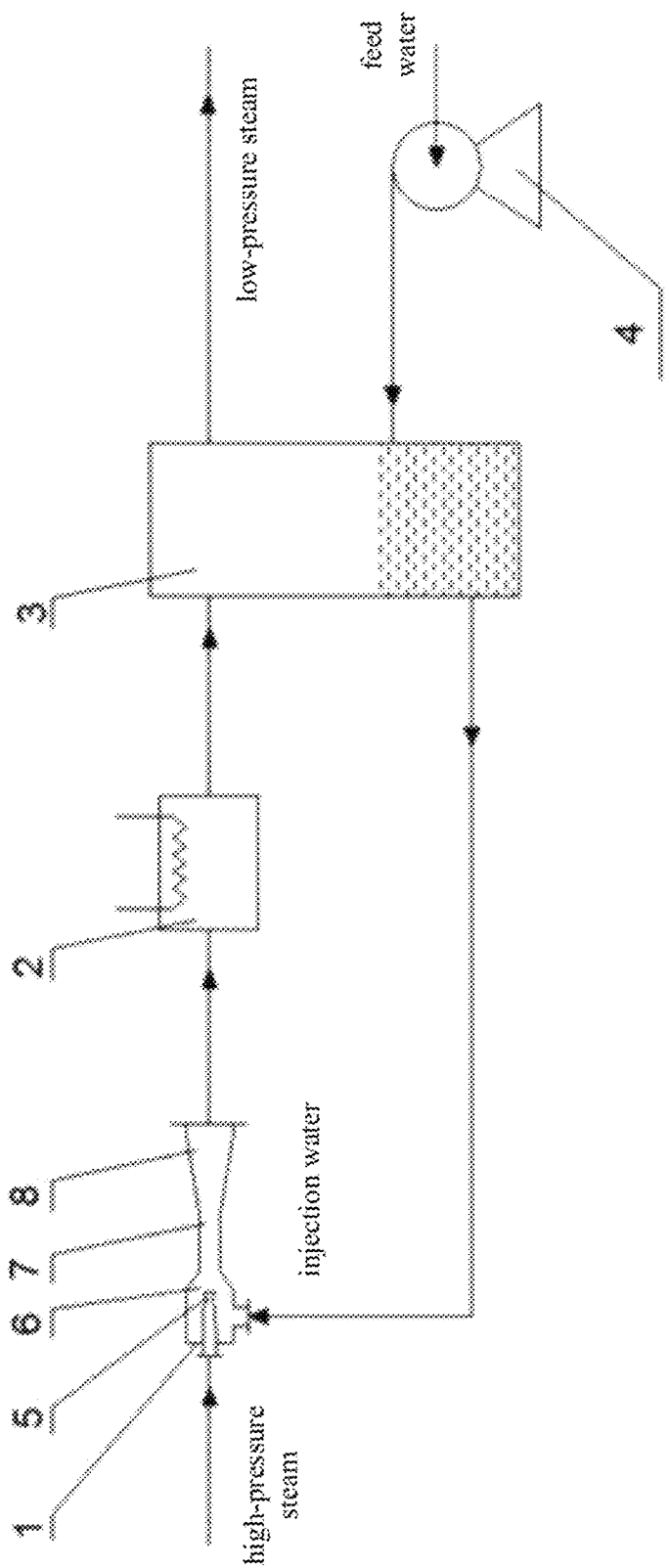
FIG. 1 is a schematic diagram of a vapor source system based on vapor-liquid ejector supercharging combined with flash vaporization technology.

FIG. 1 shows a device diagram of vapor source system based on vapor-liquid ejector supercharging combined with flash vaporization technology.

The vapor source system proposed by the present disclosure comprises a vapor-liquid ejector 1, a intermediate heat exchanger 2, a flash vaporization tank 3 and a feed water pump 4, and each device is connected by pipeline; the vapor-liquid ejector 1 is composed of a convergent-divergent primary nozzle 5, a suction chamber 6, a mixing chamber 7 and a diffusion chamber 8, and a high-pressure steam inlet is connected to the inlet of the primary nozzle 5, meanwhile the injection fluid inlet of the suction chamber 6 is connected to the bottom of the flash vaporization tank 3, and the outlet of the diffusion chamber 8 is connected to the cold fluid inlet of the intermediate heat exchanger 2. When the vapor source system is in operation, the high-pressure motive steam drives the vapor-liquid ejector 1, and a supersonic jet is generated at the outlet of the primary nozzle 5, so vacuum is formed in the suction chamber 6, then low-pressure water of the flash vaporization tank 3 is sucked into the vapor-liquid ejector 1, and the vapor-liquid mixing and condensation pressure increasing are completed in the mixing chamber 7, then the pressure of the mixed fluid is continued to increase in the diffusion chamber 8, and the mixed fluid is sent into the intermediate heat exchanger 2 to increase temperature to saturated or nearly saturated fluid, then sent into the flash vaporization tank 3 to flash, and low-pressure saturated steam is generated, which is used for low-pressure steam process; the low-pressure saturated water which is not flashed is collected at the bottom of the flash vaporization tank 3, and is connected with the injection inlet of the suction chamber 6 via an extraction pipe at the bottom of the flash vaporization tank 3, so as to realize circulating supercharging flash vaporization; the feed water pump 4 increases the pressure in the low-pressure water and pumps it to the bottom of the flash vaporization tank 3 to ensure continuous and stable operation of the vapor source system.

Figure 2:
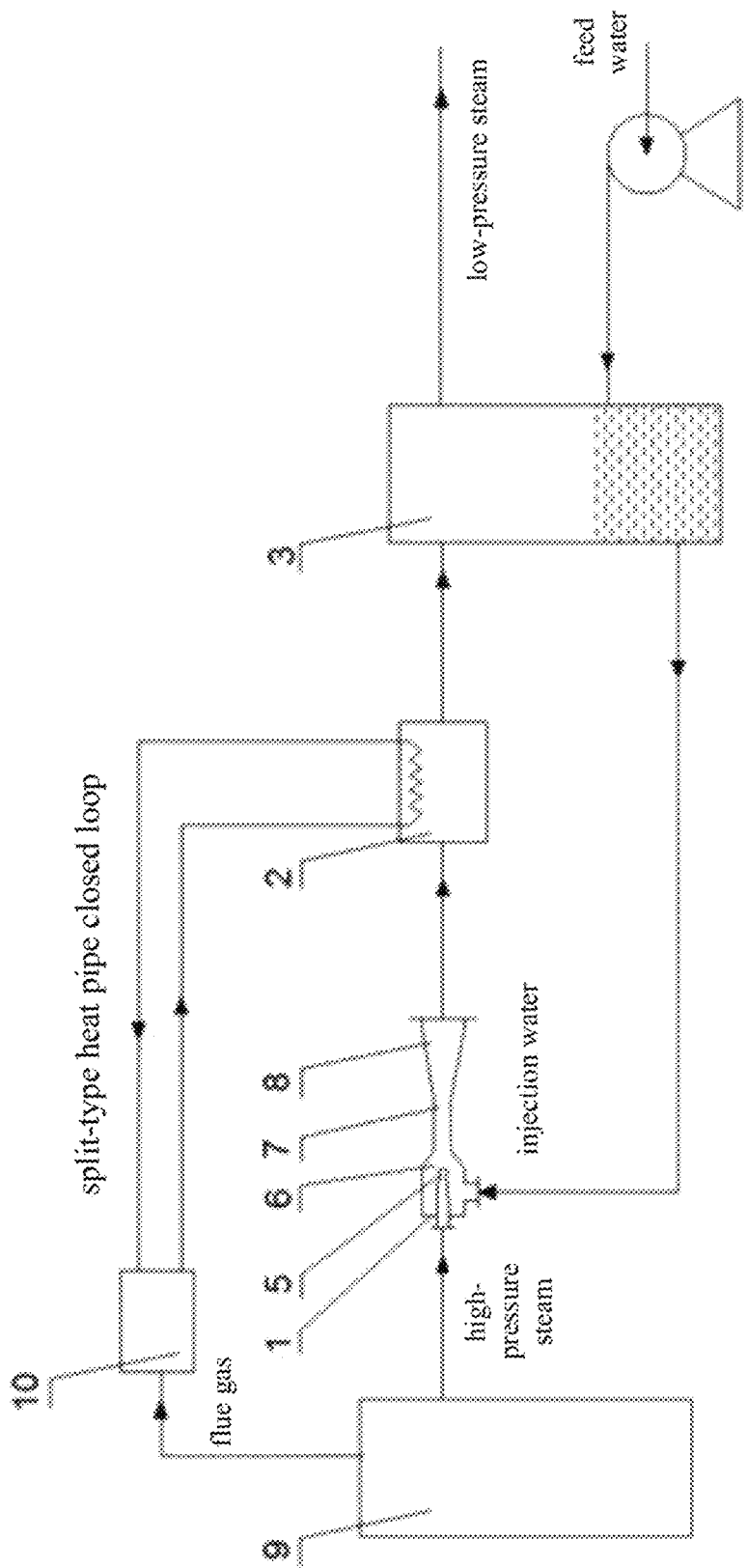
FIG. 2 is a schematic diagram of a vapor source system based on vapor-liquid ejector supercharging combined with flash vaporization technology using a split-type heat pipe heat exchanger to recover waste heat of flue gas of the boiler.

FIG. 2 shows a device diagram of vapor source system based on vapor-liquid ejector supercharging combined with flash vaporization technology using a split-type heat pipe heat exchanger to recover waste heat of flue gas of the boiler. When the vapor source system is provided with a steam boiler 9, the intermediate heat exchanger 2 and the split-type heat pipe evaporator 10 may form a closed loop, and the split-type heat pipe evaporator 10 is arranged in the rear flue of the steam boiler 9 to utilize the waste heat of the flue gas; after being evaporated, the heat pipe working medium enters the intermediate heat exchanger 2 to release condensation latent heat, heating the pressure-increased water at the outlet of the vapor-liquid ejector 1; after being condensed into liquid state, the heat pipe working medium returns to the split-type heat pipe evaporator 10 to cyclically utilize the waste heat of the flue gas.

Figure 3:
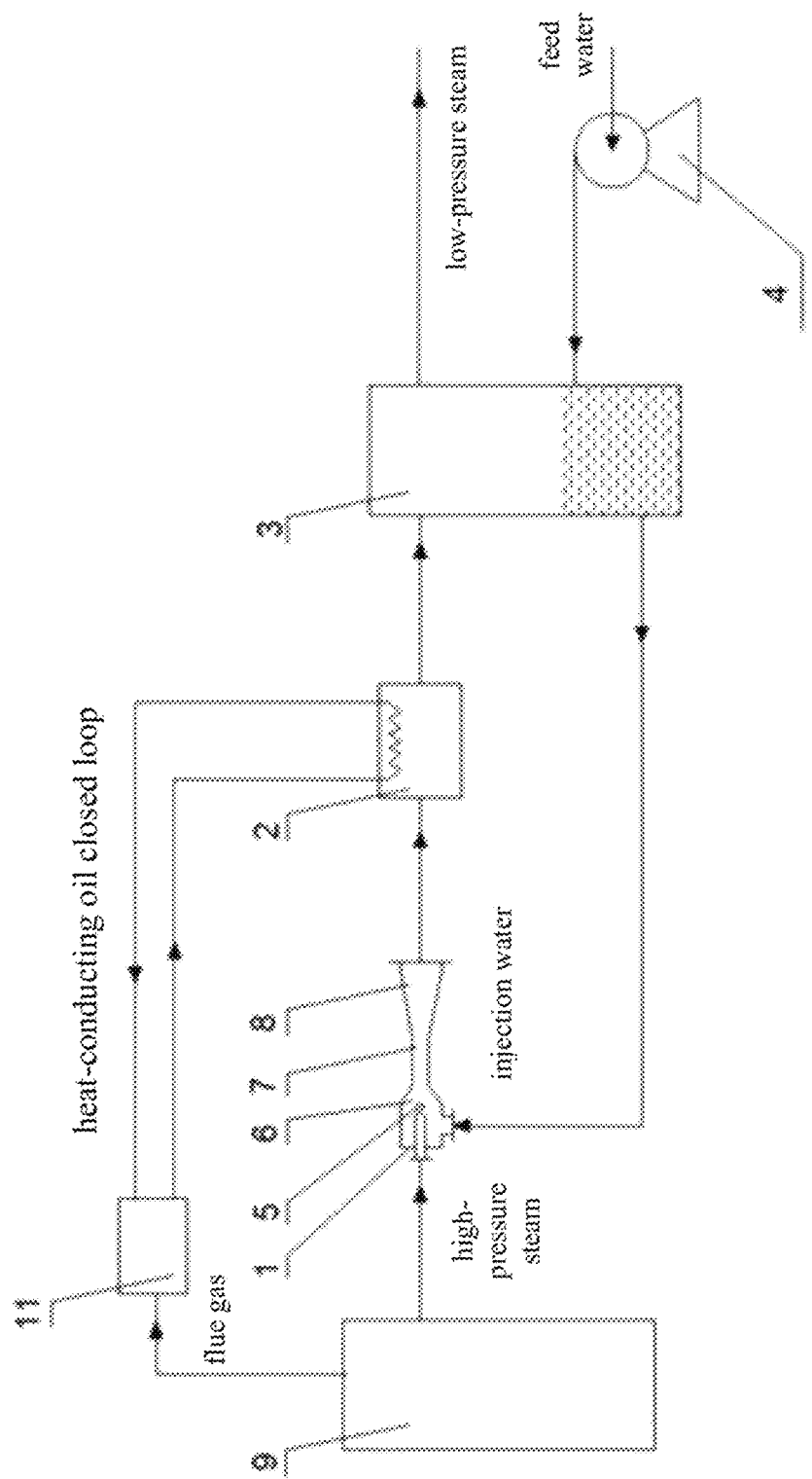
FIG. 3 is a schematic diagram of vapor source system based on vapor-liquid ejector supercharging combined with flash vaporization technology using a heat-conducting oil heat exchanger to recover waste heat of flue gas of the boiler.

FIG. 3 shows a device diagram of vapor source system based on vapor-liquid ejector supercharging combined with flash vaporization technology using a heat-conducting oil heat exchanger to recover waste heat of the flue gas of the boiler. When the intermediate heat exchanger 2 takes a form of heat-conducting oil heating, the intermediate heat exchanger 2 and the heat-conducting oil heat collector 11 form a closed loop, and the heat-conducting oil heat collector 11 is arranged in the rear flue of the steam boiler 9 to utilize the waste heat of the flue gas, and the heat-conducting oil enters the intermediate heat exchanger 2 after increasing temperature, then the pressure-increased water at the outlet of the vapor-liquid ejector 1 is heated, and the heat-conducting oil returns to the heat-conducting oil heat collector 11 after decreasing the temperature, so as to the waste heat of the flue gas is circularly utilized.

Figure 4:
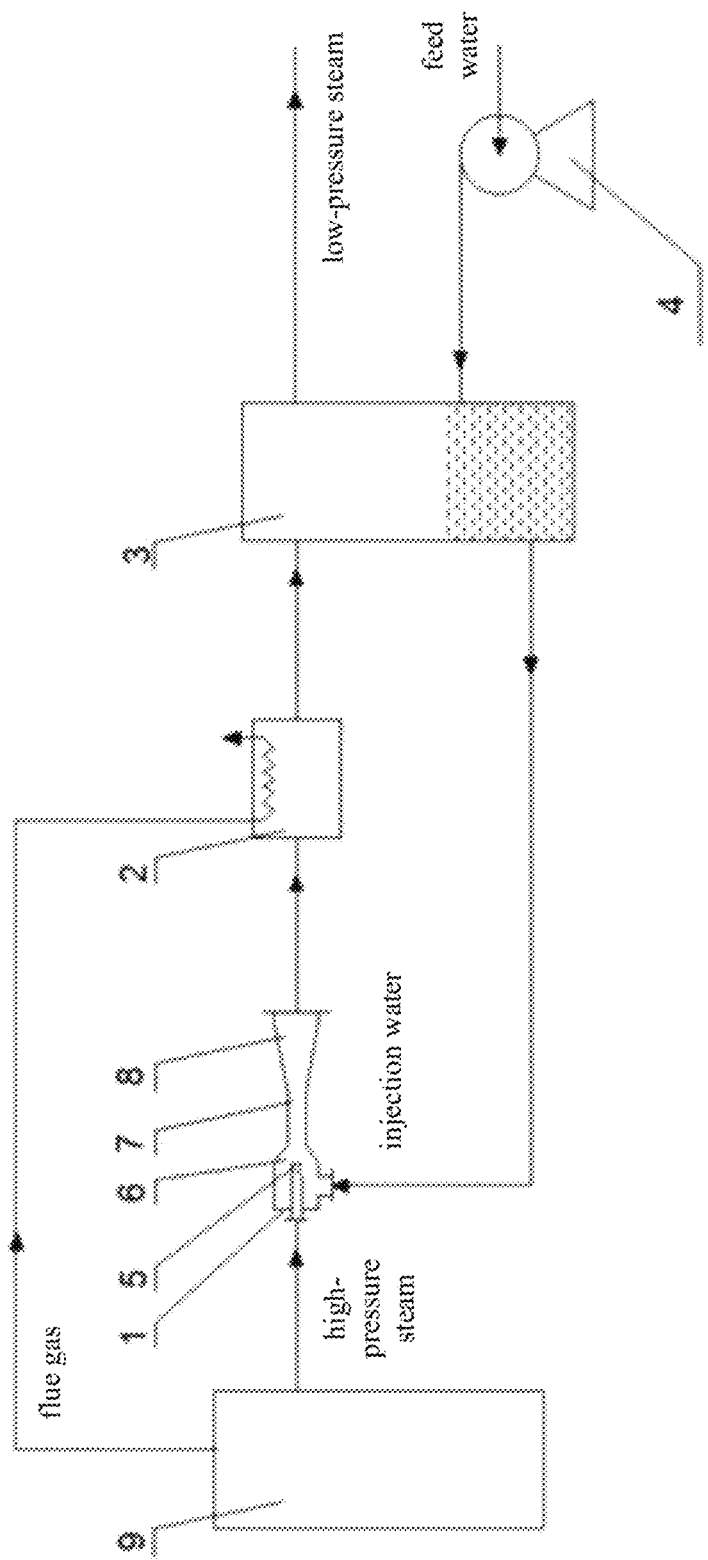
FIG. 4 is a schematic diagram of a vapor source system based on vapor-liquid ejector supercharging combined with flash vaporization technology using a flue gas heat exchanger to recover waste heat of flue gas of the boiler.

FIG. 4 shows a device diagram of vapor source system based on vapor-liquid ejector supercharging combined with flash vaporization technology using a flue gas heat exchanger to recover waste heat of the flue gas of the boiler. The intermediate heat exchanger 2 is directly arranged in the rear flue of the steam boiler 9, and the pressure-increased water at the outlet of the vapor-liquid ejector 1 is sent to the intermediate heat exchanger 2 via a connecting pipeline to utilize the waste heat of the flue gas, and then sent to the flash vaporization tank 3 via the connecting pipeline to flash.

What is claimed is:

1. A vapor source system based on vapor-liquid ejector supercharging combined with flash vaporization technology, the vapor source system comprising a vapor-liquid ejector (1), a intermediate heat exchanger (2), a flash vaporization tank (3) and a feed water pump (4), wherein each device is connected by pipeline; the vapor-liquid ejector is successively connected by a convergent-divergent primary nozzle (5), a suction chamber (6), a mixing chamber (7) and a diffusion chamber (8), and a high-pressure steam inlet is connected to the inlet of the primary nozzle (5), meanwhile an injection fluid inlet of the suction chamber (6) is connected to a bottom of the flash vaporization tank (3), and an outlet of the diffusion chamber (8) is connected to a cold fluid inlet of the intermediate heat exchanger (2); wherein, the vapor source system is driven by high-pressure motive steam, and a supersonic jet is generated at the outlet of the primary nozzle (5), then vacuum is formed in the suction chamber (6), so low-pressure water of the flash vaporization tank (3) is sucked into the vapor-liquid ejector (1), and the vapor-liquid mixing and condensation pressure increasing are completed in the mixing chamber (7), then the pressure of the mixed fluid is continued to increase in the diffusion chamber (8), and the mixed fluid is sent into the intermediate heat exchanger (2) to increase temperature to saturated or nearly saturated fluid, then sent into the flash vaporization tank (3) to flash, and low-pressure saturated steam is generated; the low-pressure saturated water which is not flashed is collected at the bottom of the flash vaporization tank (3), and is connected with the injection inlet of the vapor-liquid ejector (1) via the extraction pipe at the bottom of the flash vaporization tank (3), so as to realize a circulating supercharging flash vaporization; the feed water pump (4) sends the low-pressure water to the bottom of the flash vaporization tank (3) to ensure continuous and stable operation of the vapor source system.

2. The vapor source system based on vapor-liquid ejector supercharging combined with flash vaporization technology according to claim 1, wherein the intermediate heat exchanger (2) of the vapor source system utilizes waste heat of flue gas of a steam boiler (9) as heating heat source, and the specific form thereof is a split-type heat pipe heat exchanger, a heat-conducting oil heat exchanger or a flue gas heat exchanger.

3. The vapor source system based on vapor-liquid ejector supercharging combined with flash vaporization technology according to claim 2, when the form of the intermediate heat exchanger (2) of the vapor source system is a split-type heat pipe heat exchanger, the intermediate heat exchanger (2) and the split-type heat pipe evaporator (10) form a closed loop, and the split-type heat pipe evaporator (10) is arranged in the rear flue of the steam boiler (9) to utilize the waste heat of the flue gas, and the intermediate heat exchanger (2) of the vapor source system apply latent heat of condensation of heat pipe working medium to release heat.

4. The vapor source system based on vapor-liquid ejector supercharging combined with flash vaporization technology according to claim 2, when the form of the intermediate heat exchanger (2) of the vapor source system is a heat-conducting oil heat exchanger, the intermediate heat exchanger (2) and a heat-conducting oil heat collector (11) form a closed loop, and the heat-conducting oil heat collector (11) is arranged in the rear flue of the steam boiler (9) to utilize the waste heat of the flue gas, and the intermediate heat exchanger (2) uses the heat-conducting oil as a heating heat source.

5. The vapor source system based on vapor-liquid ejector supercharging combined with flash vaporization technology according to claim 2, when the form of the intermediate heat exchanger (2) of the vapor source system is a flue gas heat exchanger, the intermediate heat exchanger (2) is arranged in the rear flue of the steam boiler (9) to directly utilize the waste heat of the flue gas.

* * * * *